Aug. 14, 1956

O. G. NELSON 2,759,169

ELECTRICAL SELECTOR SYSTEM

Filed Jan. 19, 1952

2 Sheets-Sheet 1

INVENTOR.
Orville G. Nelson

BY

Cook and Schermerhorn

ATTORNEYS

Aug. 14, 1956 O. G. NELSON 2,759,169

ELECTRICAL SELECTOR SYSTEM

Filed Jan. 19, 1952 2 Sheets-Sheet 2

INVENTOR.

Orville G. Nelson

BY

Cook and Schermerhorn

ATTORNEYS

United States Patent Office 2,759,169
Patented Aug. 14, 1956

2,759,169

ELECTRICAL SELECTOR SYSTEM

Orville G. Nelson, Portland, Oreg.

Application January 19, 1952, Serial No. 267,287
4 Claims. (Cl. 340—162)

This invention relates to a selector system of rather general application and has particular reference to improvements in a control system for playing selected ones of a plurality of sound recordings in a sound reproducing mechanism.

The invention is applicable to different types of sound reproducing mechanisms employing grooved records, magnetic wire or tape, or sound track film or the like. The invention is of especial advantage, however, as disclosed in the illustrated embodiment, to extend existing conventional systems employing a small number of grooved disc records to accommodate a larger repertoire of sound recordings.

Certain conventional forms of record player for public places and the like which have long been in extensive use have a repertoire of twenty-four playing sides on flat disc records, the mechanism being operated generally from a plurality of coin operated remote control selection boxes located at convenient places about the premises. More recently, larger machines have been introduced having as many as forty or fifty record selections, which have tended to make the old systems obsolete before the equipment was worn out. Hence, it is desirable to develop some means to increase the repertoire of existing systems which are still in good operating condition so that the old and still useful apparatus will not have to be discarded prematurely.

It will be apparent that the change-over from a twenty-four record system to a forty or fifty record system ordinarily necessitates not only the replacement of the record player itself, but also the replacement of all the remote control selector boxes and wiring because heretofore there has been no satisfactory way to modify existing selector boxes to accommodate the greatly increased number of selections which are now desired. This has greatly retarded the introduction of the new, larger record playing machines so that it is usually not practical to install them except on premises where the income is sufficiently high and in new establishments.

It has heretofore been proposed to provide reversible title holders in a push button type remote control selector box in order to double the number of titles in a selector box of a given size, but the proper operation of the proposed system depended upon certain resistance values in the circuits which imposed limitations on the use of standard electrical components available to the trade and also limited the maximum number of possible record selections the circuits could handle.

The general objects of the present invention are, therefore, to provide an improved electrical selector system of general application, to provide an improved control system for sound reproducing mechanisms, and to provide means for adapting the remote control selector boxes used in connection with such mechanisms to a larger repertoire in order to utilize existing apparatus and wiring in a system having a greater number of record selections.

Other objects are to provide means for converting existing remote control selector boxes in the manner described at a cost considerably less than the cost of new selector boxes, to provide such an adaptation for a rotary drum type title holder that will require no additional instructions to the customer, to provide an improved relay construction for use in a system of the type described, and to provide an improved wiring arrangement in the control system which will permit extension of the system by the addition of standard components to accommodate any desired number of record selections without impairing the operation.

Important features of the invention relate to a novel remote control selector box and to a system of electrical circuits for controlling a sound reproducing mechanism to initiate the playing of the particular sound recordings selected on the selector box. By the use of reversible title holders the number of titles on a carrier of the drum type, for example, is doubled without increasing the physical dimensions of the drum or selector box. The title holders are mounted for reversal by the usual knob which rotates the title drum whereby one display side of the title holders is presented to view when the drum is rotated in one direction and the other display side is presented when the drum is reversed.

A switch responsive to the reversal of the title holders controls an additional circuit to the sound reproducing mechanism whereby each position of the title drum is effective for selecting two recordings instead of only one. It has been the practice to use thirty-wire cables in certain types of conventional recording systems having twenty-four sound recordings available in the sound reproducing machines and twenty-four titles in the remote control selector box in order to provide a number of extra wires for use in case some of the wires in the cable should break. The present system utilizes two of the hitherto unused and extra wires in such a thirty-wire cable, thereby making re-wiring of the premises unnecessary. The system is also arranged to maintain open circuits for all of the record selector solenoids not intended to be energized so that improper record selections cannot result from shunt circuits through solenoids added to increase the repertoire, as occurs in certain prior art devices. The electrical system can be extended to accommodate any number of additional selections without impairing its operation in any way.

The invention will be better understood and additional objects and advantages will become apparent as the description proceeds in connection with the accompanying drawings illustrating a preferred embodiment. It will be apparent to persons skilled in the art that certain features may be used without others and that most of the features of the electrical system are not limited to the reproduction of sound recordings but are of general application to selector systems for various purposes. The drawings are merely to illustrate the principles of the invention and are not intended to limit the invention.

Figure 2:
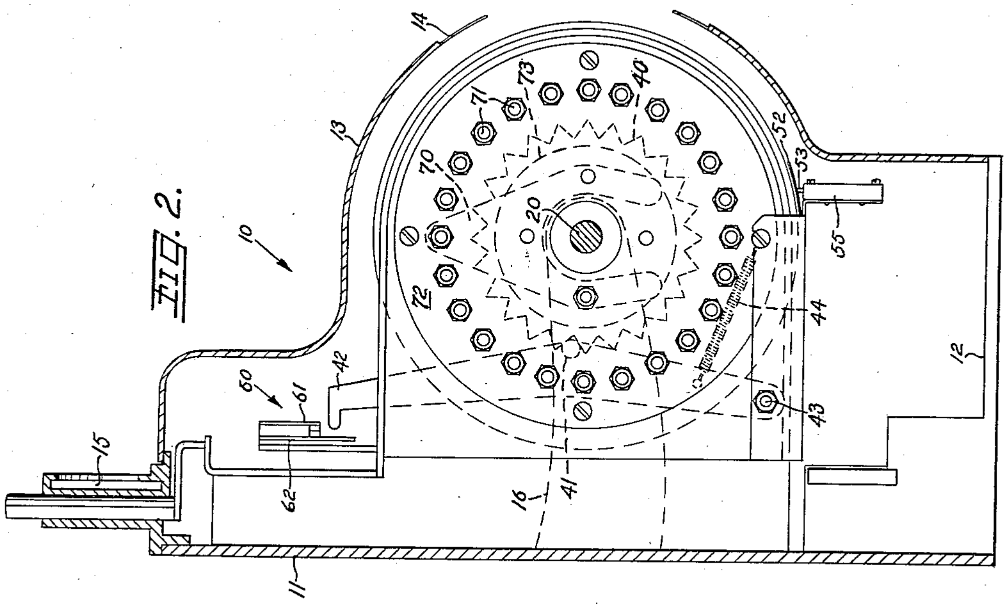
Figure 2 is a view taken on the line 2—2 of Figure 1.
Figure 1:
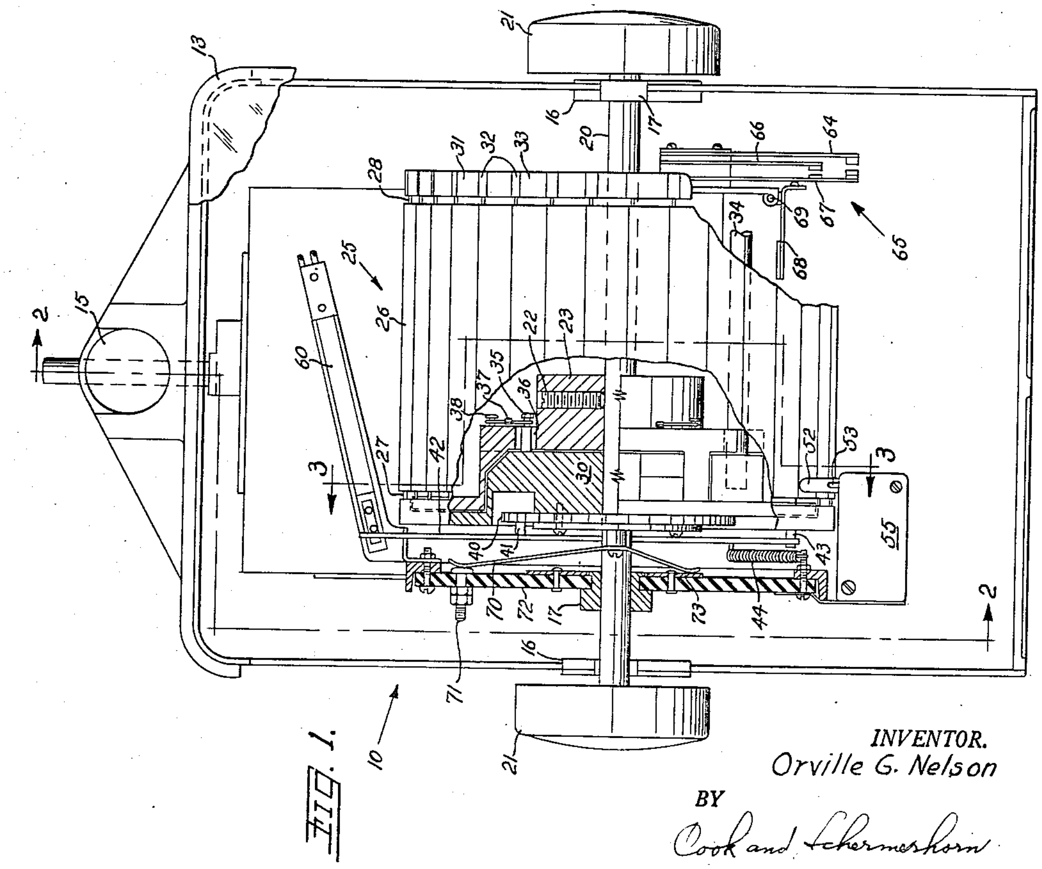
Figure 1 is a front elevation view of the remote control selector box of the present invention, with certain parts broken away and other parts shown in section.

For the purpose of illustrating how the principles of the invention are applied to utilize certain conventional apparatus to accommodate a greater number of selections, Figures 1 and 2 show a modification and adaptation of the type of remote control record selector box disclosed in Patent No. 2,324,908, issued to E. E. Collison et al., July 20, 1943. The selector box disclosed in the aforesaid patent contains twenty-four record titles mounted on a rotary title drum equipped with a contact arm arranged to wipe a circle of twenty-four contacts. These contacts are connected with twenty-four different wires in a thirty-wire cable to energize circuits to initiate the playing of one or more selected sound recordings in a sound reproducing mechanism having an available repertoire of twenty-four sound recordings. The apparatus is of the type generally referred to as a coin operated device and the aforementioned patent is referred to for a more complete disclosure of the coin controlled mechanism and other conventional details understood by persons skilled in the art and not illustrated in the present drawings.

The present invention provides for the modification of certain parts and structure within the selector box disclosed in the aforesaid Collison patent to make available forty-eight record selections instead of twenty-four while retaining and utilizing a major part of the original selector box. An establishment having a considerable number of remote control selector boxes can thus effect a relatively simple and inexpensive conversion from a twenty-four record to a forty-eight record system, as compared with the cost of removing and discarding all the old equipment and installing all new wiring and control boxes, as well as new record playing machines. The present system also enables the utilization of two of the twenty-four record playing machines to obviate the procurement of a new and more expensive model having a larger capacity. The term "record" is herein used to designate a single sound recording. Such a record or sound recording may constitute a single playing side of a grooved disc phonograph record, a tape or wire recording, or a sound track film or the like, as explained hereinabove.

*Selector box*

The remote control selector box is indicated generally by the numeral 10 in Figures 1 and 2. The operating mechanism is mounted on a back plate 11 which is adapted to be secured to a vertical wall. Extending forwardly from the lower edge of the back plate 11 is a horizontal bottom plate 12 adapted to support the box on a counter or table and to secure a removable cover 13 having front and side walls to enclose the operating mechanism. A front window 14 provides an area of visibility to view simultaneously a number of the titles from which selections are to be made. A coin slot 15 leads to the usual mechanism provided in devices of this type for receiving and accepting proper coins and rejecting improper coins and slugs. The details of this mechanism are not illustrated, as they are well understood in the art and form no part of the present invention.

Extending forwardly from opposite sides of the back wall 11 are a pair of rigid arms 16. A shaft 20 is supported in bearings 17, one of which is mounted in one of the arms 16. The ends of shaft 20 extend through the housing 13 and are equipped with knobs 21 for rotating the shaft. Attached to the shaft 20 by a set screw 22 or other suitable means is a hub plate 23 disposed within a rotor or title drum designated generally at 25. Drum 25 carries a plurality of pivotally mounted title holders 26 having opposite display sides **26*a* and 26*b* (Figure 3) which may be moved into view behind the window 14**.

The title holders 26 comprise frames to hold two record titles each, one title being presented to view on the display side **26*a* and the other title appearing on the display side 26*b* of the title holder. The title holders are mounted for pivotal movement on pins 27 and 28 adjacent the edges of the holders. The pins 27 project into bearing apertures around the periphery of a rotor and plate 30 and pins 28 are similarly mounted in an annular end plate 31. The plate 31 has a plurality of radial tooth-like projections 32 to receive the pins 38 and has open spaces 33 between these projections to provide access to the ends of the title holders 26 for changing the paper cards or the like on which the titles may be printed. The annular end plate 31 is supported on a plurality of rods 34 extending from the end plate 30**.

Figure 3:
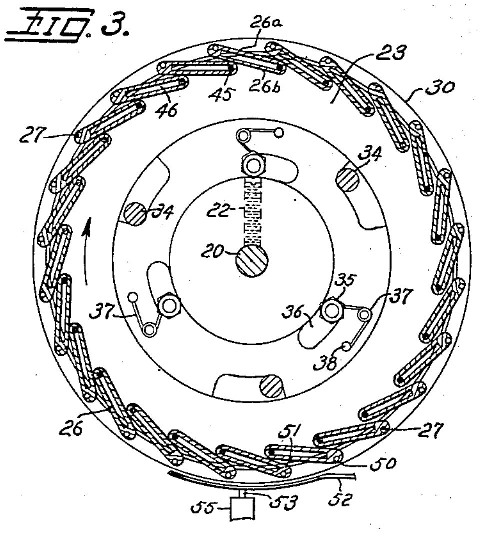
Figure 3 is a view taken on the line 3—3 of Figure 1, showing the title holders in one position.

A plurality of pins 35 are mounted in the rotor end plate 30 to extend through arcuate slots 36 in the hub plate 23 as best shown in Figures 1 and 3. V-shaped springs 37 are each connected at one end to the pins 35 and at the other end to pins 38 in hub plate 23. Pins 38 are disposed opposite the mid portions of slots 36 so that the springs 37 will bias the rotor end plate 30 toward one end or the other of slots 36. Thus, in Figure 3 the pins 35 are biased in a counterclockwise direction away from the pins 38, and in Figure 4 the pins 35 are biased in a clockwise direction away from the pins 38. The springs are stiff enough to overcome the moving friction and prevent any intermediate rest position when the knobs 21 are released.

Rotor end plate 30 is equipped with the usual toothed indexing wheel 40 having a number of interdental recesses equal to the number of title holders 26. Indexing wheel 40 is engaged by a pin 41 on an indexing lever 42 which is pivotally mounted at 43 on a support extending from the back plate 11. A spring 44 holds the pin 41 in engagement with the indexing wheel 40 with sufficient force to index the title holdes 26 opposite a stationary index mark (not shown) on the housing 13 at the side of window 14.

The relative rotational movement between hub plate 23 and rotor end plate 30 allowed by the length of arcuate slots 36 while the rotor plate 30 is restrained against free rotation by the indexing mechanism is utilized to reverse the title holders 26. The peripheral rim portion of hub plate 23 rotates in a recess in plate 30 as shown in Figure 1, and is equipped with a series of pins 45 projecting into slots 46 in the ends of the title holders as shown in Figure 3. Thus, when shaft 20 and hub plate 23 are turned in a clockwise direction, the pins 45 are caused to move in a clockwise circumferential direction relative to pins 27 to swing the title holders about the pins 27 and present their display sides **26*a* outwardly for viewing through the window 14 as shown in Figure 3. Further clockwise rotation of shaft 20 by means of the knobs 21 causes the ends of slots 36 engaging the pins 35 to turn the rotor bodily for viewing all of the display sides 26*a* of the respective title holders. After such rotation of the title drum as a whole, the indexing wheel 40 is effective to stop the drum in a rest position with the selected title holder positioned at the index mark adjacent window 14**.

Figure 4:
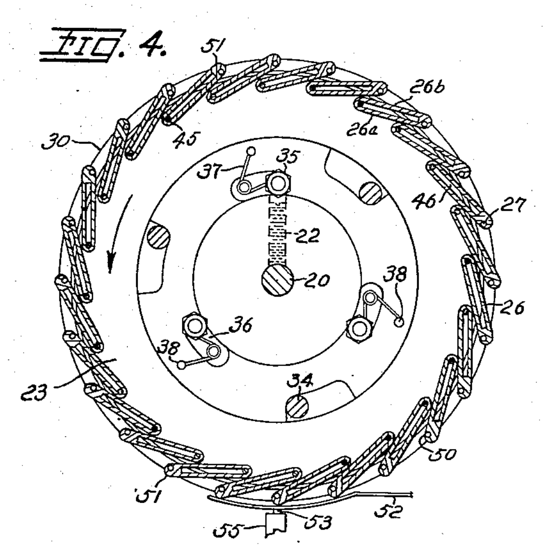
Figure 4 is a view similar to Figure 3 but showing the title holders reversed.

When knobs 21 and shaft 20 are reversed to turn in counterclockwise rotation, the rotor end plate 30 is at first held stationary by the indexing wheel 40, allowing the pins 45 to move counterclockwise relative to the pins 27 and reverse the title holders to present the display sides **26*b* outwardly as shown in Figure 4. The effect of indexing spring 44 is superior to the effect of biasing springs 37, causing the latter to yield first whenever the knobs 21 are reversed. Further counter-clockwise rotation of shaft 20 and hub plate 23 causes rotor end plate 30 and the title drum as a whole to be rotated along with the shaft 20 by reason of the engagement of the ends of slots 36 with pins 35. When the knobs 21 are released the indexing wheel 40 is again operative to hold the title drum in a rest position with a selected one of the title holders 26 positioned in the center of window 14** at the stationary index mark.

The title holders do not swing to tangential positions on the rotor but engage behind each other in their limit or rest positions at an easy reading angle in both directions of rotation. When the rotor is turned upwardly past the window 14 the title holders are tilted upwardly, and when the rotor is turned downwardly the title holders are tilted downwardly for the best view of each new title as it comes into viewing position behind the window.

It will be observed in Figures 3 and 4 that the end portions of the title holders 26 are not symmetrical around their pivot pins 27. Each pivot pin 27 is mounted in eccentric position closer to side 26*a* than side 26*b* to provide a low cam surface 50 on the side 26*a* which is closer to the pivot pin 27 than the higher cam surface 51 on the side 26*b*. The cam surfaces 50 or 51 engage a spring finger 52 bearing against a plunger button 53 of a switch 55. Switch 55 is a snap acting two-position switch which assumes one position when the surfaces 50 engage the finger 52 and a different position when the plunger 53 is slightly depressed by engagement of the high cam surfaces 51 with the finger 52. A portion of the spring finger 52 is curved concentrically with the title drum through sufficient length of arc to engage one or more of the title holders at all times so that the switch 55 is not actuated by the rotation of the drum as a whole in one direction or the other, but only by the reversal of the title holders 26. Thus, in Figure 3 the plunger 53 is extended to place the switch in one position when the sides 26*a* of the title holders are turned outwardly and in Figure 4 the plunger 53 is depressed to place the switch in its other position when the sides 26*b* of the title holders are turned outwardly of the drum. Further reference will be made to switch 55 and its function and purpose will be explained in connection with the wiring diagram of the electrical system in Figure 7.

Referring again to Figures 1 and 2, there is shown a switch 60 arranged to be actuated periodically by the indexing arm 42 when the title drum is rotated. This switch comprises a pair of spring fingers 61 and 62 having contact elements. The spring fingers 61 and 62 are normally biased toward each other to maintain the switch in closed position, but the finger 62 is engaged by indexing arm 42 each time the pin 41 is cammed over one of the points of the indexing wheel 40. Hence, if the knobs 21 are twisted rapidly to spin the title drum in an attempt to actuate the sound reproducing mechanism repeatedly to play more than one sound recording on a single coin, the rapid vibration of indexing arm 42 will hold the switch 60 open for longer intervals than it is closed and render the record selecting circuits temporarily inoperative until this abuse is discontinued and the title drum is allowed to come to rest to make a single selection in its intended manner. Hence, the switch 60 is normally closed and performs no function in the ordinary selection of a record.

A coin operated switch, indicated generally by the numeral 65, is shown in Figure 1. This switch comprises three contact fingers 64, 66 and 67 normally biased apart to separate their respective contacts. A bell crank arm 68 is mounted on a pivot 69 to engage the finger 67. Coins deposited in the coin slot 15 which successfully pass the automatic slug and small coin rejecting mechanism, drop on the arm 68 with sufficient impact to cause its bell crank end to press the contact on finger 67 momentarily against the contacts on fingers 64 and 66 to energize the circuits which are to make the record selection in a manner to be explained presently. A conventional coin operated switch designed to control a single circuit may be used in conjunction with a relay having the necessary contacts to close two circuits instead of one.

The record selection is made in part by a contact arm 70 on the rotor end plate 30 which wipes over a circle of contacts 71 on a stationary insulating plate 72. One of the bearings 17 is mounted in this plate. The contacts 71 are spaced for engagement by the arm 70 in each indexed position of the rotor end plate 30, the number of contacts 71 being equal to the number of title holders 26. Arm 70 has an opposite end engaging an annular contact plate 73 to make electrical connection with the arm throughout its 360 degrees of rotation.

*Electrical system*

The description thus far has related to the remote control selector box. The invention also comprises a novel relay 75 shown in side and end views in Figures 5 and 6 and illustrated in part and schematically in the wiring diagram of Figure 7. The relay comprises an open rectangular frame 76 having a bracket 77 supporting a plurality of switch units, each having a pair of relatively stationary contact fingers 78 and 79 disposed on opposite sides of a relatively movable contact finger 80. These contact fingers are clamped together in mutually insulated relation between a stack of insulating spacers 81. Each switch unit 78, 79, 80 thus constitutes a single pole, double throw switch, and the number of these units in the relay is equal to the number of title holders 26 in the remote control box 10. Hence, in the illustrated embodiment there are twenty-four such switch units. There are also two additional similar switch units, indicated in their entirety in Figure 5 by the numerals 82 and 83 applied to the movable contact fingers.

Figures 5, 6, 7:
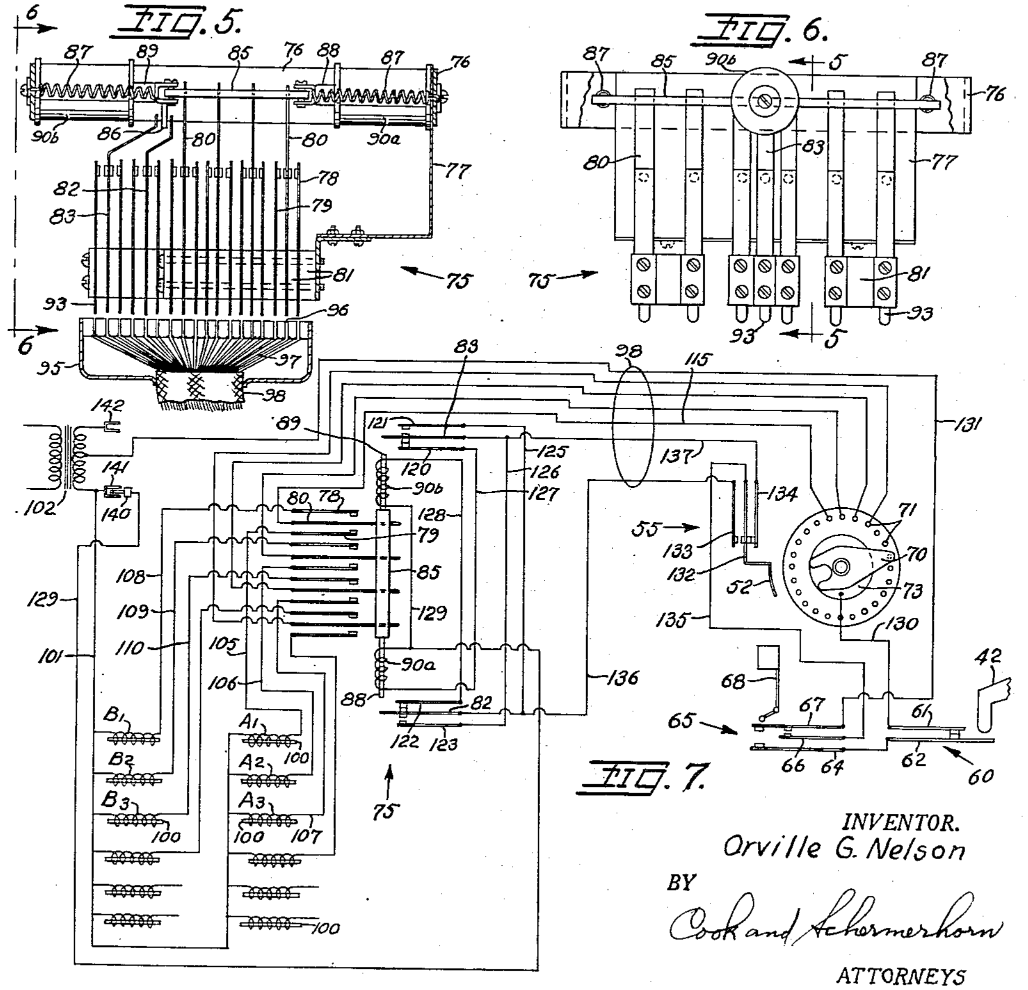
Figure 5 is a sectional view, taken on the line 5—5 of Figure 6, of an improved relay in the control system.
Figure 6 is a view taken on the line 6—6 of Figure 5, with certain parts broken away.
Figure 7 is a schematic wiring diagram of the electrical system of the invention.

The twenty-four central contact fingers 80 all extend through slots in an insulating armature plate 85 for movement in unison to the right or left as viewed in Figure 5. A pin 86 on the plate 85 engages the central contact finger of switch unit 82 in right-hand movement and engages the central contact finger of switch unit 83 in left-hand movement. Armature plate 85 is normally biased to the central rest position shown, by opposed tension springs 87. Magnetic plungers 88 and 89 are connected to opposite sides of plate 85. Plunger 88 forms an armature for a solenoid 90*a* to pull the plate 85 to the right when this solenoid is energized, and plunger 89 forms an armature for a solenoid 90*b* to pull the plate 85 to the left when solenoid 92 is energized. These solenoids are mounted in axial alignment on opposite sides of rectangular frame 76.

The projecting ends 93 of the relay switch fingers, which are ordinarily provided for making soldered connections with the various circuit wires, are utilized in the present construction as contact prongs for a multiple circuit plug connector 95. The plug connector 95 has an individual recessed contact element 96 for each contact finger of the relay, the contact elements 96 being connected to wires 97 in a cable 98. Thus, the usual soldered connections are dispensed with and the relay may be readily removed for adjustment or repair by merely detaching the plug connector 95 to disconnect all the circuit wires simultaneously.

Referring now to Figure 7, the coils $A_1$, $A_2$, $B_1$, $B_2$, etc., designate the usual solenoids employed in record playing machines of the type referred to for actuating the record changing device to play the particular records selected. These solenoids have movable armatures or plungers 100 which are actuated when the solenoids are energized, either to project mechanical stops, or to operate switch means as disclosed in the mentioned Collison patent. The selections effected by these solenoids are not cancelled until the selected recordings are in playing position, so that a plurality of selections may be made at any time. The specific means for controlling the record changing device forms no part of the present invention and is not shown.

In the case of a record playing machine having a repertoire equal to the number of available selections in the remote control selector box, which in the illustrated embodiment is forty-eight, all the solenoids $A_1$, $A_2$, $B_1$, $B_2$, etc., are contained in the one machine. An advantage of the present system, however, is that it allows the repertoire to be doubled without discarding the old equipment. It is often desirable and less costly merely to make the adaptation in the remote control selector boxes described hereinabove, and then purchase one additional twenty-four record playing machine. In such case, the solenoids $A_1$, $A_2$, etc., of the A series, are associated with one twenty-four record machine, and the other solenoids $B_1$, $B_2$, etc., of the B series, are associated with a second twenty-four record playing machine. This arrangement is particularly suitable for establishments which do not have the space to install a large and elaborate record playing machine in a prominent place as an attraction to the public. The two small machines are then located in a storeroom or other out-of-the-way place, and it is necessary only to install the remote control selector boxes and loud speakers in the space which is occupied by the general public. Machines which have become obsolete merely because of an old-fashioned appearance can be utilized in this way. Thus, it is to be understood that the solenoids of the A and B series may be associated with a single sound reproducing mechanism, or with two separate sound reproducing mechanisms, without affecting the operation of the system.

Each selector solenoid has one terminal connected to a common wire 101 leading from a suitable source of power at the proper voltage, such as transformer 102. The other terminals of the solenoids are connected to wires leading to different contact fingers of a relay 75, as exemplified by wires 105 to 110. Wire 105 from solenoid $A_1$ is connected with contact finger 79, and wire 108 from solenoid $B_1$ is connected with a contact finger 78, and the other solenoid terminals are similarly connected to the relatively stationary contact fingers of the other relay switch units. The movable contact fingers are connected with the circle of contacts 71 in the remote control selector box, as exemplified by wire 115 connected with the first movable contact finger 80.

The two additional switch units, previously identified in their entirety in Figure 5 by the numerals 82 and 83, have relatively stationary contact fingers 120, 121, 122 and 123 arranged as shown in Figure 7. Stationary contact finger 121 is connected through wire 125 to movable contact finger 82, and stationary contact finger 123 is connected through wire 126 to movable contact finger 83. Stationary contact finger 120 is connected through wire 127 to one terminal of relay solenoid **90*a*, and stationary contact finger 122 is connected through wire 128 to one terminal of relay solenoid 90*b*. The other terminals of the relay solenoids are connected together through wire 129 to the transformer 102**.

Annular contact disc 73 in the remote control selector box is connected to contact finger 61 by wire 130. Coin actuated contact finger 67 is connected to the source of power by a line wire 131 from transformer 102. Contact finger 64 is connected directly with finger 62 of switch 60.

Switch 55 contains a relatively movable contact finger 132 and two relatively stationary contact fingers 133 and 134 disposed on opposite sides of the movable finger to form a single pole, double throw switch. Movable contact finger 132 is connected through wire 135 to contact finger 66 of the switch 65. Contact finger 133 is connected through wires 136 and 125 to relay contact fingers 82 and 121. Contact finger 134 is connected through wires 137 and 126 to relay contact fingers 83 and 123.

From the foregoing description of the wiring connections, it will be appreciated that the wires, identified generally by the numeral 97 in the cable 98 in Figure 5, comprise, with reference to Figure 7, the wires 131, 136, 137 and the group of wires containing the wire 115. Assuming forty-eight record selections in the repertoire, the cable 98 will contain twenty-four of the wires 115, plus the three wires 131, 136, 137, plus an additional wire, not shown, for a lighting circuit. Thus, twenty-eight wires of the conventional thirty-wire cable are employed in active circuits, leaving two spare wires available in case of breakage of any of the active wires. The lights and lighting circuits for the selector boxes are not included in the present disclosure, as they form no part of the invention. The selector boxes are wired in parallel, only one box being shown in the drawings.

Wire 129 is shown connected with a plug 140 in a jack or receptacle 141 connected with wire 101 to provide the same voltage supply for both the relay and selector solenoids. If the relay solenoids **90*a* and 90*b* require a different voltage, the plug 140 is inserted in jack 142. Even if the two jacks 141 and 142 provide the same voltages relative to the common wire 131, there is still the advantage that this common wire then carries a current equal to the difference of the currents in the relay and selector solenoid circuits, thereby permitting longer lines without excessive voltage drop. In other words, the additional jack 142** permits the solenoids to be energized in a three wire circuit where the lines are so long that the resistance of a two wire circuit might impair dependable operation of the solenoids.

*Operation*

Throughout the drawings, the various switches are shown in their normal rest positions when no part of the selection mechanism is in operation, except that it will be understood that switch 55 has two possible rest positions. In this respect, Figure 7 conforms to Figure 3, wherein the display sides **26*a* of the title holders are presented outwardly, allowing contact finger 132 to engage contact finger 134**.

Let it be assumed now that contact arm 70 is turned to the contact 71 connected with wire 115, switch 60 being in closed position after the arm 70 comes to rest. When a proper coin is deposited in coin slot 15, its impact against arm 68 causes its bell crank end to move contact finger 67 into engagement with fingers 64 and 66 for momentary energization of two different circuits. One circuit thus energized includes wire 131, switch fingers 67 and 66, wire 135, switch fingers 132 and 134, wire 137, switch fingers 83 and 120, wire 127, solenoid **90*a*, and wire 129. Energization of solenoid 90*a* draws armature plate 85 downward as viewed in Figure 7, to shift all the movable contact fingers typified by contact finger 80 into engagement with the respective lower stationary contact fingers typified by contact finger 79, and also to shift contact finger 82 into engagement with contact finger 123. The latter is connected through wires 126 and 137 with switch finger 134 to provide an electrical interlock, so that if knob 21 is suddenly reversed in an attempt to obtain two selections on one coin, the relay 75 will not be reversed. In such event engagement of contact finger 132 with finger 133 would merely maintain the energization of relay solenoid 90*a* and solenoid 90*b* could not be energized as long as fingers 82 and 122** were separated.

The engagement of contact finger 80 with contact finger 79 completes a second circuit from supply wire 131 through switch fingers 67, 64, 62, 61 to wire 130, and thence through arm 70, contact 71, wire 115, switch fingers 80 and 79, wire 105, solenoid $A_1$, back to supply wire 101. Solenoid $A_1$ thus actuates its armature 100 to effect the reproduction of the sound recording designated by the display side **26*a* of the particular title holder 26 which has been placed in indexed position behind the window 14. Conventional reproducing mechanisms usually have a predetermined playing sequence and the recording thus selected will be played in its turn if there are other selections preceding the designated one. The above described operations of the relay and selector solenoids occur very quickly, and after switch 65 returns to its normal open circuit position the relay 75 also returns immediately to its normal rest position shown. The actuated armature 100**, however, remains in actuated position until it is returned by the record playing mechanism. Conventional record players also are equipped with suitable means for energizing the turntable motor, phonograph amplifier, and record changing device when the first one of the solenoids $A_1$, $A_2$, $B_1$, $B_2$, etc., is energized, as explained, for example, in the Collison patent.

When the shaft 20 is turned clockwise in Figure 3, additional record selections may be made in the same manner by depositing a new coin in the coin slot 15 for each such selection. As long as the shaft 20 is turned clockwise in Figure 3, the available selections will be limited to those presented to view on the display sides 26a of the title holders 26, and it will be possible to energize only the A series of solenoids such as $A_1$, $A_2$, etc., in Figure 7.

If now the shaft 20 is turned counterclockwise, the title holders 26 are reversed (rotated approximately 145 degrees on their pins 27, 28) to present their display sides 26b outwardly of the title drum as shown in Figure 4. This rotation of the title holders 26 causes the cam surfaces 51 to depress switch plunger 53 and move contact finger 132 out of engagement with contact finger 134 and into engagement with contact finger 133. The former circuit through wire 137 and relay solenoid 90a is thereby switched over to include instead wire 136, contact fingers 82 and 122, wire 128, and relay solenoid 90b. Energization of solenoid 90b shifts the movable contact fingers, typified by finger 80, upwardly in Figure 7, bringing finger 80 into engagement with contact finger 78 and shifting contact finger 83 into engagement with contact finger 121 to connect fingers 133 and 134 together for interlock purposes, as previously described. If the contact arm 70 in the remote control selector box is still positioned on the contact 71 which is connected with wire 115, this selection circuit will now include relay contact finger 80, contact finger 78, wire 108, solenoid $B_1$ and wire 101. Solenoid $B_1$ thus extends its armature plunger 100 to initiate at the proper time the playing of the sound recording designated by the title presented on the display side 26b.

Further rotation of the shaft 20 in a counterclockwise direction in Figure 4 accompanied by the deposit of coins in the coin slot 15 will effect additional record selections by other solenoids of the B series. It is, however, not necessary to make all selections desired on either of display sides 26a or 26b of the title holders before reversing the title holders. The selections may be made at random without regard to the side of the title holder on which they are presented or whether the A or B series of solenoids will be actuated.

After each record selection in the manner hereinabove described, the immediate reopening of the coin operated switch 65 breaks the circuit to the selection solenoid $A_1$ or $B_1$, etc., which has been energized, and also breaks the circuit to whichever one of relay solenoids 90a or 90b has been energized. An important feature of the invention resides in the positive opening of the solenoid circuits by the relay 75 by the centering springs 87 as soon as the solenoids 90a or 90b are deenergized. Thus, one terminal of each solenoid of the A and B series remains connected to the common line wire 101 while an open circuit is insured at the other terminal of every solenoid at switch fingers 78, 79, etc. In a certain other known system intended for the same purpose, the solenoids have been connected together in such a manner that additional shunt circuits existed, making it possible to obtain the playing of more than one recording for the deposit of a single coin. This defect in the prior system thus gives free plays when the system is extended by the inclusion of additional selection solenoids to increase the repertoire. The great increase in the number of solenoids in parallel so reduces the resistance of the normally high resistance shunt paths in the prior system as to pass sufficient current to energize improperly one solenoid in addition to the one intended each time a selection is made and a single coin deposited.

Such a spurious selection signal is impossible in the present system by reason of the positive opening of each selection solenoid circuit at the switch fingers 78, 79, etc., and for the additional reason that the solenoids of the A series can never become connected with the solenoids of the B series. When the relay armature plate 85 is shifted downwardly in Figure 7, the circuit connections from the right-hand terminals of all the B solenoids in Figure 7 terminate at the relay switch fingers, as typified by switch finger 78, and the wiring connections from the right-hand terminals of the A solenoids terminate at the contacts 71, except in the case of the single circuit which has been selected. When the relay armature plate 85 is shifted upwardly in Figure 7, the right-hand terminals of all the A series solenoids are open circuited at the relay contact fingers corresponding to the finger 79, and all of the connections with the right-hand terminals of the B series of solenoids are open circuited at the contacts 71 except for the one selected circuit. This desirable condition permits the present system to be extended to include any number of selection solenoids without regard to the resistance of the solenoids and other circuit constants which impose definite limitations on other conventional systems intended for the same purpose.

If the knobs 21 are twisted rapidly in an attempt to spin the title drum for the purpose of obtaining more than one record play on a single coin, no selection at all will be obtained. As hereinabove explained, in such event the indexing arm 42 will vibrate rapidly, preventing the switch 60 from remaining closed long enough while switch arm 70 is on any one contact 71 to develop sufficient magnetic force for a sufficient interval of time to move the armature plungers 100 to extended positions. The switch actuating end of indexing arm 42 has a considerable range of movement, and the switch 60 is capable of closing only through a relatively short portion of this range of movement adjacent one limit thereof. Therefore, in each vibrating cycle of the indexing arm 42 the contact finger 62 is disengaged from the contact finger 61 a much longer time than it is engaged therewith.

If coins are deposited at the same instant in two control boxes, both customers will obtain a record play, though one may not be the record that was selected. Such coincidence is very rare, and the improper record play will occur even then only when one record is controlled by the A solenoids and the other by the B solenoids, since the electrical interlock prevents reversal of the relay 75 after it has started to move in one direction.

The principles of the invention illustrated in Figure 7 are of general application to different types of selector and control systems where it is desired to effect a large number of selections of control functions with a small number of wires. From the illustrative example it will be appreciated by persons skilled in the art that many times the present number of selections may be made with the same number of wires, if desired. In the conventional selector box each wire from a selector switch contact is limited to one selection. In applicant's Figure 7, each wire 115 is used for two different selections by energizing it in conjunction with one or the other of wires 136 and 137 whereby the twenty-four wires 115 plus the three wires 131, 136 and 137 provide forty-eight selections. It will be apparent that by the use of additional relays and additional switch members operable by the selector knob the available wires may be energized in still greater numbers of different combinations to provide thousands of selections, if desired. All of the selections are made practically instantaneously as compared with the relatively slow operation of a stepping switch selector as employed in some conventional selector systems.

Having now described my invention and in what manner the same may be used, what I claim as new and desire to protect by Letters Patent is:

1. In a sound reproducing system and the like, two series of solenoids arranged to initiate the playing of selected ones of a plurality of sound recordings in a sound reproducing mechanism, a relay having two sets of fixed contacts and a set of movable contacts, said solenoids of the two series each having one terminal connected with one of said fixed contacts of the two sets, respectively, a plurality of reversible title holders each having two display sides, a carrier supporting said title holders for movement into and out of viewing position, a manual operator for advancing said carrier in one direction or the other, means operable by said manual operator to reverse said title holders when said carrier is reversed by said manual operator, a selector switch operable by said carrier and having a series of fixed contacts connected with the respective movable relay contacts, a pair of opposed windings on said relay for engaging said movable relay contacts with one or the other of said two sets of fixed relay contacts, and a switch operable by the reversal of said title holders to energize one or the other of said relay windings.

2. A system as defined in claim 1 wherein said carrier for said title holders comprises a rotatable drum and said title holders are pivotally mounted on said drum for reversal of said display sides.

3. A system as defined in claim 2 including a lost motion connection between said drum and said manual operator, and means connected with said manual operator effective in lost motion movement to turn said title holders to different display positions on said drum.

4. A system as defined in claim 3 wherein said lost motion connection and said means are arranged to display one side of said title holders in one direction of rotation of the drum and the other side thereof in the opposite direction of rotation of the drum.

References Cited in the file of this patent

UNITED STATES PATENTS

| | | |
|---|---|---|
| 570,967 | Stamm | Nov. 10, 1896 |
| 1,090,816 | Henschel | Mar. 17, 1914 |
| 1,116,007 | Burns et al. | Nov. 3, 1914 |
| 1,787,620 | Favarger | Jan. 6, 1931 |
| 1,795,341 | Marsh | Mar. 10, 1931 |
| 2,181,104 | Moorhouse | Nov. 21, 1939 |
| 2,420,065 | Bone | May 6, 1947 |
| 2,456,893 | Roth | Dec. 21, 1948 |
| 2,551,522 | Andres | May 1, 1951 |
| 2,570,930 | Filo et al. | Oct. 9, 1951 |
| 2,573,076 | Welch | Oct. 30, 1951 |
| 2,621,241 | Jensen | Dec. 9, 1952 |
| 2,624,795 | Bodoh | Jan. 6, 1953 |